April 7, 1931.  H. B. CRIBB  1,799,732
COMBINED SWEEP AND SHOVEL PLOW
Filed Sept. 6, 1929  5 Sheets-Sheet 3
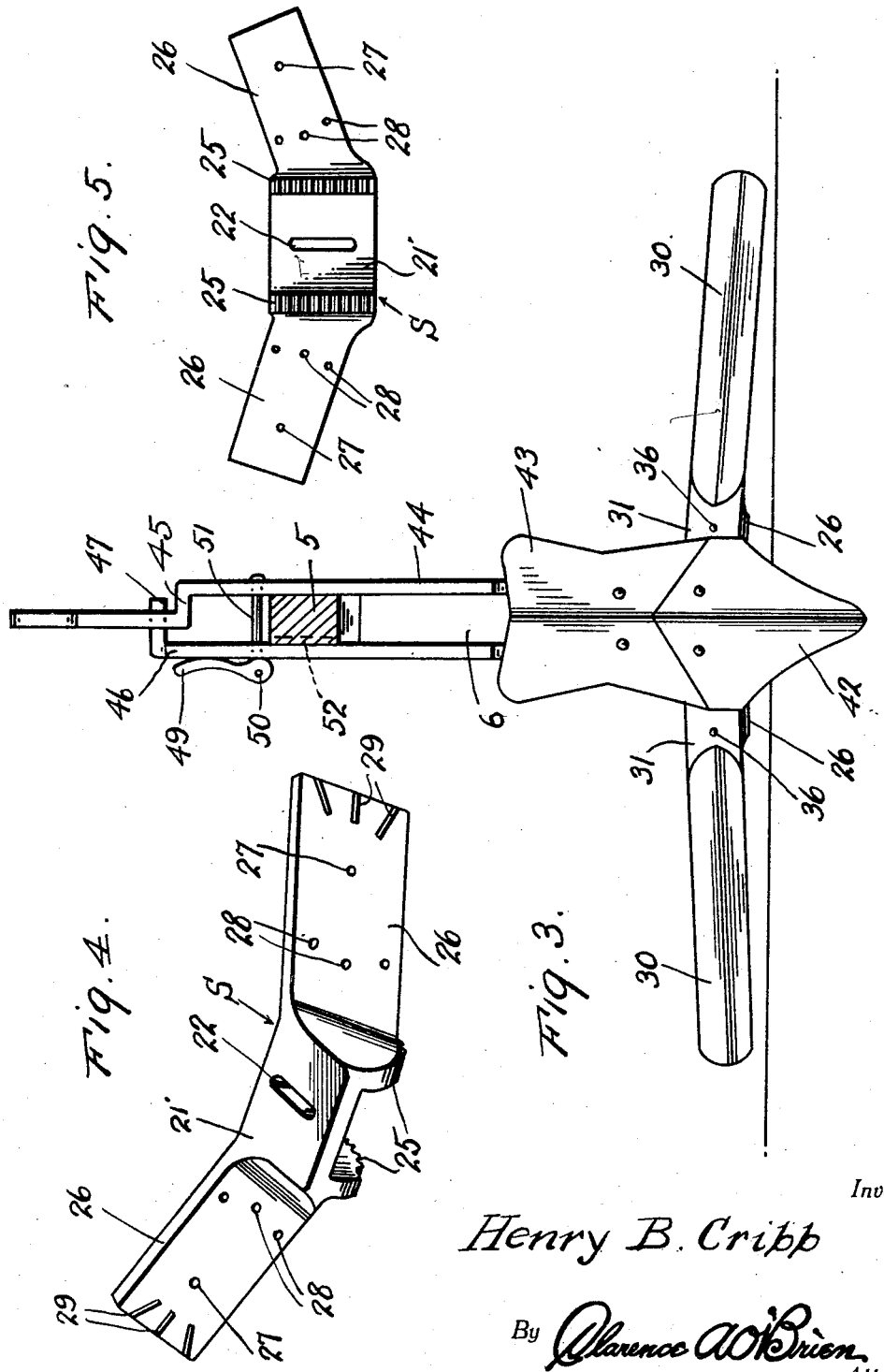
Inventor
*Henry B. Cribb*
By *Clarence A. O'Brien*
Attorney

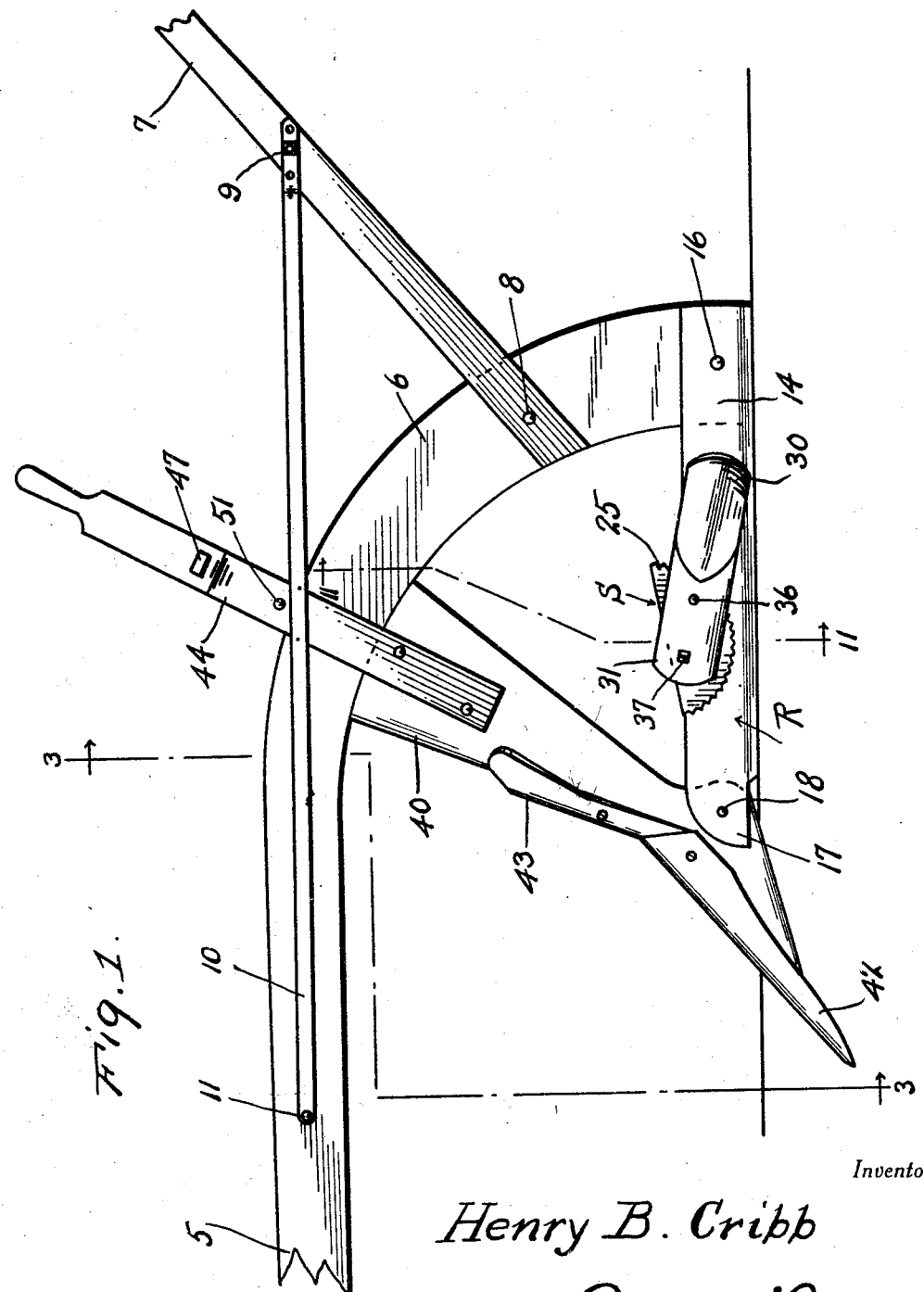

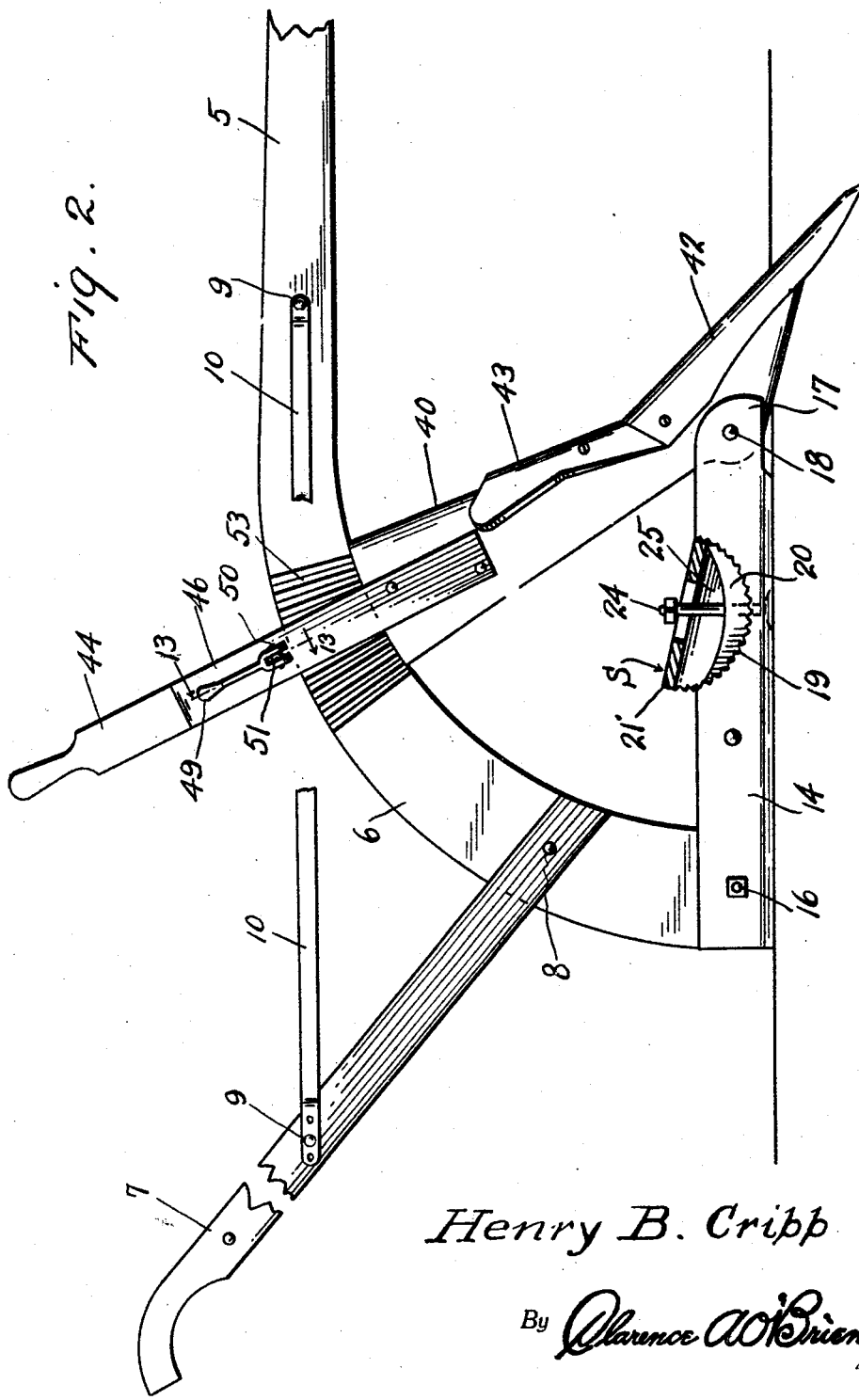

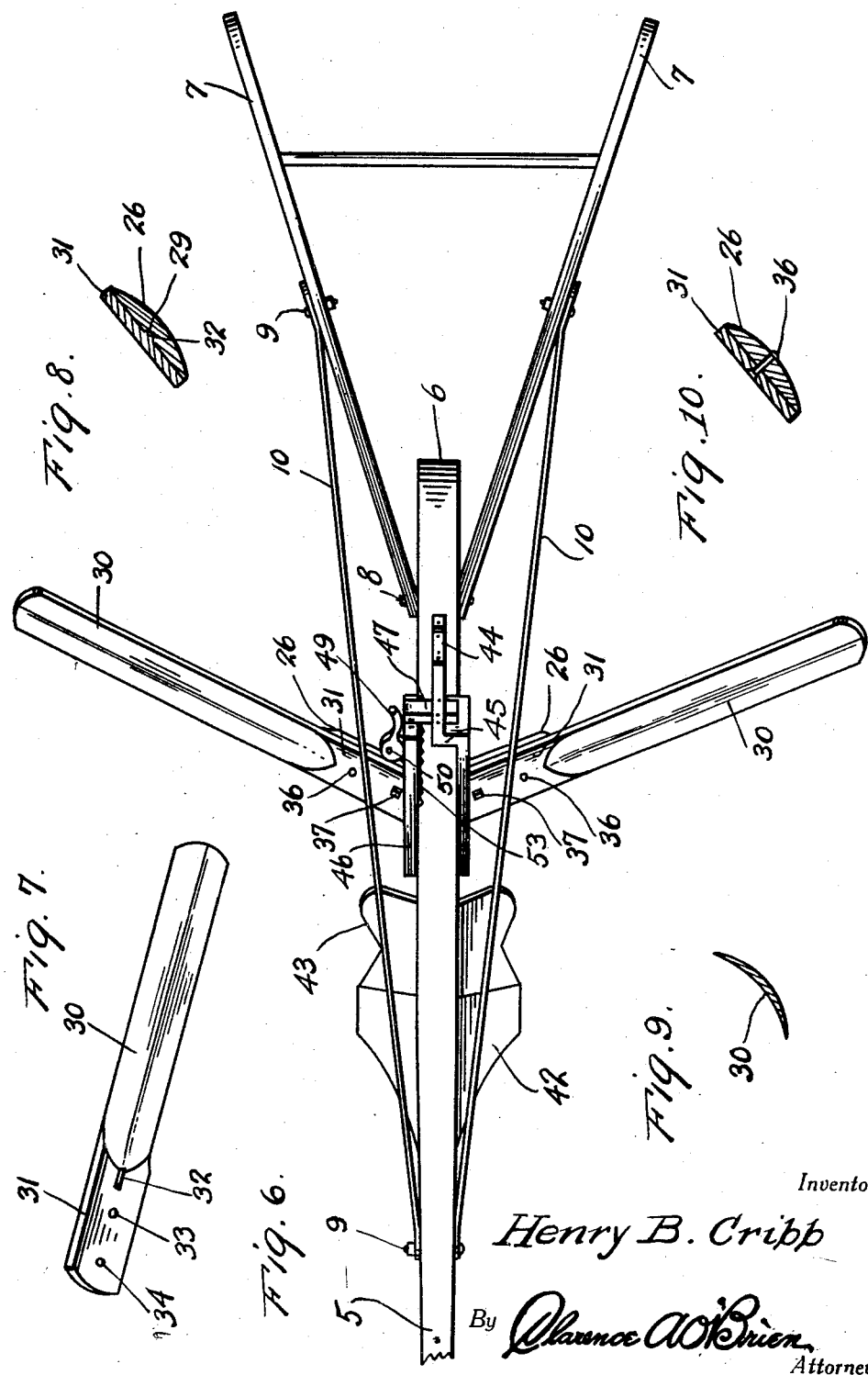

April 7, 1931. H. B. CRIBB 1,799,732
COMBINED SWEEP AND SHOVEL PLOW
Filed Sept. 6, 1929 5 Sheets-Sheet 5
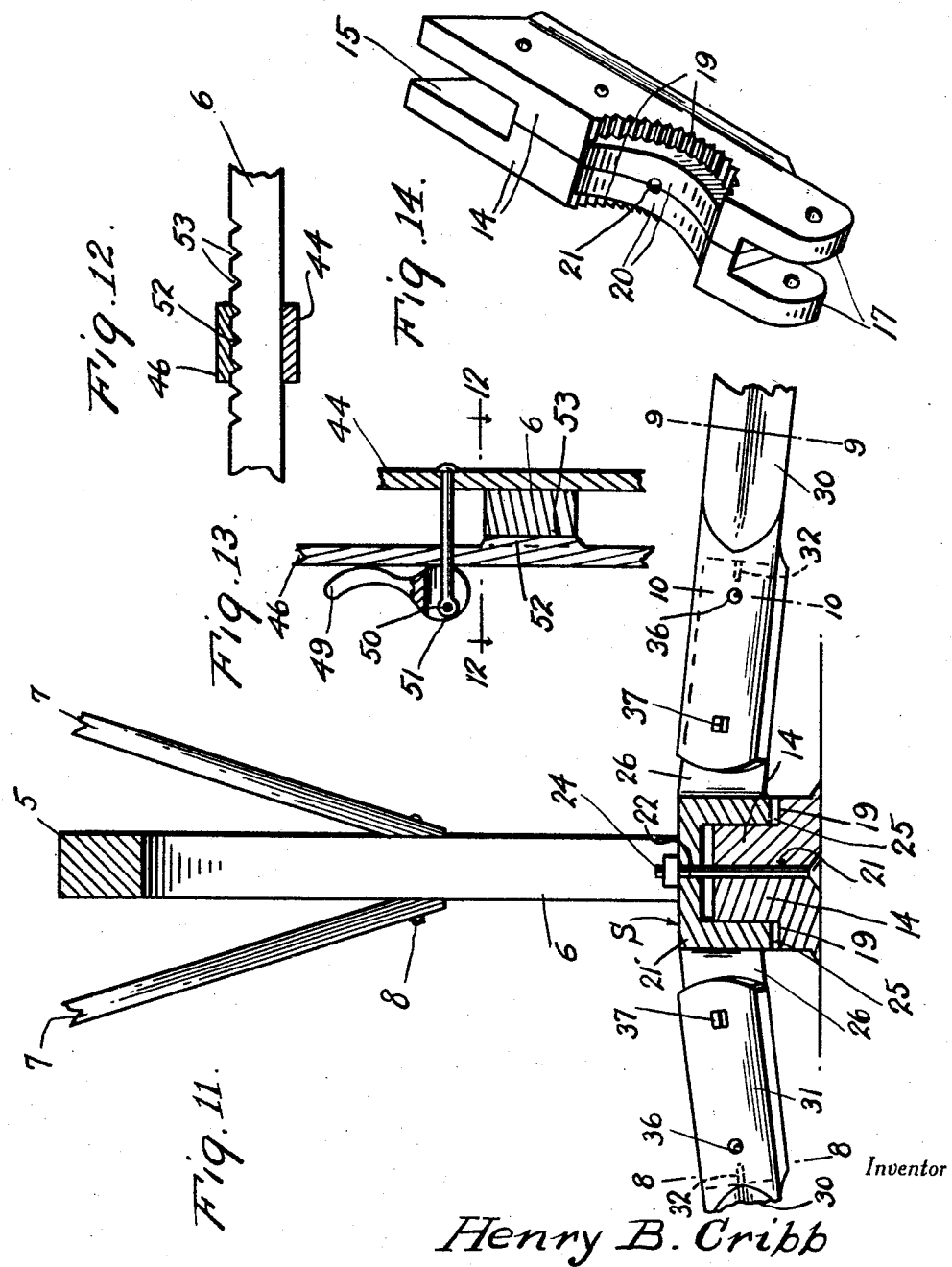
Inventor
Henry B. Cribb
By Clarence A. O'Brien
Attorney Patented Apr. 7, 1931

1,799,732

UNITED STATES PATENT OFFICE

HENRY BOYD CRIBB, OF FAIR BLUFF, NORTH CAROLINA

COMBINED SWEEP AND SHOVEL PLOW

Application filed September 6, 1929. Serial No. 390,824.

The present invention relates to a combined sweep and shovel plow and has for its prime object to provide a structure permitting adjustment of the sweep and plow in an expeditious, easy and convenient manner.

Another very important object of the invention resides in the provision of a combined sweep and shovel plow of this nature which is simple in construction, easy to assemble and disassemble, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the structure embodying the features of my invention, Figure 2 is another side elevation thereof taken opposite to that shown in Figure 1 and showing a portion of the sweep casting in section, Figure 3 is a vertical transverse section taken substantially on the line 3—3 of Figure 1, Figure 4 is a perspective view of the sweep casting, Figure 5 is a front elevation thereof, Figure 6 is a top plan view of the device, Figure 7 is a perspective view of one of the weeder blades, Figure 8 is a sectional view taken substantially on the line 8—8 of Figure 11, Figure 9 is a section taken substantially on the line 9—9 of Figure 11, Figure 10 is a detail section taken substantially on the line 10—10 of Figure 11, Figure 11 is a vertical transverse section taken substantially on the line 11—11 of Figure 1, Figure 12 is a detail sectional view taken substantially on the line 12—12 of Figure 13, Figure 13 is a sectional view taken substantially on the line 13—13 of Figure 2, Figure 14 is a perspective view of the foot.

Referring to the drawing in detail it will be seen that the numeral 5 denotes a beam having one end curved downwardly to provide a leg 6. Handles 7 are pivotally engaged as at 8 with the leg 6 to incline upwardly and rearwardly and have adjustably connected to intermediate portions thereof as at 9 braces 10 which extend forwardly and are connected to the beams 5 as at 11.

A foot R extends forwardly from the lower end of the leg 6. This foot R is constructed in two pieces 14 riveted together and having their rear ends spaced apart as is indicated at 15 to straddle the lower end of the leg 6 and to be secured thereto as at 16 and the forward ends of the pieces 14 terminate in spaced parallel ears 17 with a pivot pin 18 extending therethrough concentric with respect to the curvature of the leg 6.

Arcuate serrated notches 19 are formed in the forward portions of the upper edges of the pieces 14 and have downwardly bellied shoulders 20 the inner sides thereof between which is provided a vertically extending opening 21.

A sweep casting is denoted generally by the letter S and is constructed with a central body plate 25 having a longitudinally extending slot 22 formed therein to receive bolt 24 which extends through the opening 21.

Depending from the ends of the body portion 21 are segments 25, the lower peripheries of which are serrated to cooperate with serrated notches 19. Wings 26 extend outwardly from the ends of the body 21 and the segment 25 and diverge rearwardly in respect to each other.

Each of these wings 26 is provided with an intermediately located opening 27 and a series of arcuately arranged inner openings 28 and a plurality of elongated grooves 29 in the outer ends radially disposed in respect to the opening 27.

A weeder blade is mounted on each wing 26 and is of elongated construction to provide blade 30 transversely curved and formed on a shank plate 31 having a projection 32 to be received in one of the grooves 29, intermediate opening 33 to register with the opening 27 and an end opening 34 to register with one of the openings 28.

Pins 36 extend through openings 27 and 33 and pins 37 extend through opening 34 and 28. Obviously the angle of the weeder blade may be changed in respect to the wings 26. It will further be seen that the casting S may be adjusted in a rocking manner by loosening the nut on the bolt 24 and raising the casting to disengage the serrated portions of the segments 25 and the notches 19 and then adjusting the casting to the angle desired.

A frog 40 is of angular construction and is rockably mounted on pin 18 between the ears 17 and the upper edge of the frog is arcuate to move along the under arcuate edge of the leg 6. A point 42 is mounted on the lower portion of the frog while the breast plate 43 is mounted on the upper portion thereof.

A handle bar 44 is secured to the frog 40 to extend upwardly along one side of the leg 6 and is then offset inwardly as is indicated at 45. An auxiliary handle bar 46 is attached to the other side of the frog 40 and extends upwardly along the other side of the leg 6 and has a reduced offset end 47 extending through an opening in the upper portion of the handle bar 44 above its offset 45.

A certain amount of resiliency is possessed by the bar 46. A cam 49 is pivoted as at 50 on the end of a pin 51 extending through the bars 44 and 46 and the bar 46 is provided with teeth 52 to engage notches 53 formed on said other side of the leg when the cam is disposed as is shown to advantage in Figure 3. It is obvious that the cam 49 may be swung downwardly to thus allow the teeth 52 to free from the notches 53 and then by grasping the handle portion of the bar 44 the plow unit may be adjusted to the desired depth.

It will thus be seen that I have devised a very simple sweep and shovel plow superior to the old style sweep and shovel plow now in common use in that the operator can set it any required depth without interfering with the set of the weeders. The frog sets low to the ground and enables the operator to cut a smooth shallow furrow when desired or he can change the angle thereof to dig as deep a furrow as is wanted in very short time and without excessive trouble and also without disturbing the set of the weeders.

It will further be seen that the frog can be moved backwardly or forwardly to give the weeder the desired pitch.

It is thought that the construction, operation, utility and advantages of this invention will now be quite apparent to those skilled in this art without a more detailed description thereof.

The present embodiment of the invention has been disclosed in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising a beam having a downwardly curved end portion providing a leg, a foot extending forwardly from the lower portion of the leg, a frog having its lower end pivotally mounted in the outer end of the said foot on an axis concentric with the curvature of the leg and having its upper end in sliding abutment with the curved under side of the said leg, earth engaging element on the frog, a handle bar secured to the foot and extending up alongside of the leg, and means for adjustably engaging the handle bar with the leg.

2. A device of the class described comprising a beam having a downwardly curved end portion providing a leg, a foot extending forwardly from the lower portion of the leg, a frog pivotally mounted in the foot on an axis concentric with the curvature of the leg, an earth engaging element on the frog, a handle bar secured to the foot and extending up alongside of the leg, a second handle bar projecting upwardly from the frog to the other side of the leg and having teeth for cooperating with notches on said other side of the leg, said second handle bar being resiliently flexed to normally spring outwardly from the side of the leg and means for holding the said second handle bar inwardly to engage its teeth with the notches.

In testimony whereof I affix my signature.

HENRY BOYD CRIBB.